(12) United States Patent
Schiller

(10) Patent No.: US 6,340,856 B1
(45) Date of Patent: Jan. 22, 2002

(54) ELECTRIC MOTOR

(75) Inventor: Herbert Schiller, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/581,071

(22) PCT Filed: Jun. 30, 1999

(86) PCT No.: PCT/DE99/01896

§ 371 Date: Jun. 9, 2000

§ 102(e) Date: Jun. 9, 2000

(87) PCT Pub. No.: WO00/22718

PCT Pub. Date: Apr. 20, 2000

(30) Foreign Application Priority Data

Oct. 9, 1998 (DE) .......................................... 198 46 501

(51) Int. Cl.⁷ ........................... H01F 7/02; H02K 11/00; H02K 21/12
(52) U.S. Cl. ........................... 310/156.22; 310/156.28; 310/156.14; 310/42; 310/68 D
(58) Field of Search .................................. 310/261, 265, 310/233, 156, 42, 68 D, 43, 156.22, 156.28, 156.14; 29/596–598; 335/302, 303, 304–306

(56) References Cited

U.S. PATENT DOCUMENTS

| | | | | | |
|---|---|---|---|---|---|
| 2,161,953 | A | * | 1/1939 | Dunham | 310/156 |
| 2,213,724 | A | * | 9/1940 | Vogel | 310/156 |
| 4,206,379 | A | * | 6/1980 | Onda | 310/156 |
| 4,250,421 | A | * | 2/1981 | Masuda et al. | 310/156 |
| 4,841,186 | A | * | 6/1989 | Feigel et al. | 310/156 |
| 4,850,100 | A | * | 7/1989 | Stokes | 310/156 |

\* cited by examiner

*Primary Examiner*—Tran Nguyen
(74) *Attorney, Agent, or Firm*—Ronald E. Greigg

(57) ABSTRACT

In an electric motor, in particular a commutator motor, with a magnet body (24) disposed on a rotor shaft (12) in manner fixed against relative rotation for scanning the revolution and/or rpm, which magnet body has a carrier ring (26), seated with a press fit on the rotor shaft (12), and a multi-pole ring magnet (27) received by the carrier ring, in order to produce the carrier ring of metal for the sake of greater axial force transmission to the rotor shaft (12), the carrier ring (26) is embodied with a first annular portion for the press fit and with a second annular portion (262), adjacent to it in the axial direction, that has an inside diameter for receiving the ring magnet (27) that is greater than the outside diameter of the rotor shaft (12). As a result, the stresses caused by the press fit are not transmitted to the ring magnet (27), which is fragile (FIG. 1).

21 Claims, 2 Drawing Sheets

ELECTRIC MOTOR

BACKGROUND OF THE INVENTION

1. Field of the Invention

The invention relates to electric motors, in particular a commutator motor.

2. Description of the Prior Art

Electric motors of the type with which this invention is concerned are used for example in motor vehicles as drive motors for window controls, sliding roof actuators, seat adjusters, mirror adjusters, and the like, and make it possible to establish predetermined setting positions with high precision. Scanning of the revolution and/or rpm is done by means of a Hall sensor disposed in a fixed fashion, which detects the magnetic pulses output by the two- or multi-pole ring magnet upon each revolution.

In a prior art motor of this type known from German Patent Disclosure DE 197 10 015 A1, the carrier ring is made of plastic; toward one face end, it has a conical tapering, and toward the other end it has a wedge-shaped recess. On the side of the wedge-shaped recess, a two-pole ring magnet is injection molded on, and the wedge-shaped recess brings about a good connection between the ring magnet and the carrier ring. The carrier ring is slipped with a press fit onto the rotor shaft, which facilitates assembly and makes it possible to dispense with glue for fixation purposes. The press fit is selected such that it absorbs the requisite tangential and axial forces. Producing the carrier ring of plastic makes the press fit possible without rupture of the ring magnet by mechanical stresses, since the soft plastic absorbs the stresses generated by the pressing. The conical shape of the carrier ring at the front serves to push the commutator brushes apart during assembly, so that a separate auxiliary tool for spreading the commutator brushes apart so that the magnet body seated on the rotor shaft can be pushed through can be dispensed with, thus facilitating the assembly. Once the motor is mounted in its final position, the carrier ring with the ring magnet is positioned on the rotor shaft directly upstream of the commutator brushes and downstream of a shaft bearing structurally connected to the housing, and with its face end it supports the rotor shaft axially on the shaft bearing, as long as no gear has yet been connected to the motor.

SUMMARY OF THE INVENTION

The electric motor of the invention has the advantage that the ring magnet is received by the carrier ring outside of the press fit of the carrier ring, and as a result, the stresses generated by the press fit cannot reach the fragile ring magnet, and especially not if, in a preferred embodiment of the invention, the region of the second annular portion is embodied in slit form. It is thus possible to embody the carrier ring as a metal or sintered ring, which allows a press fit with high force transmission to the rotor shaft, which is desirable for high-speed electric motors. Moreover, a metal ring is highly suitable for running up against a rotor shaft sintered bearing structurally connected to the housing. Even varying temperature conditions do not lead to stresses that threaten the ring magnet in the second annular portion of the carrier ring.

In a preferred embodiment of the invention, the outer jacket of the second annular portion that receives the ring magnet is provided with pinecone-like axial, radial or intersecting ribs. This ribbing assures an adequately firm seat of the ring magnet on the carrier ring. A ring magnet made of plastoferrite digs into this ribbing by relaxation.

In an advantageous embodiment of the invention, the carrier ring is made of nonmagnetic material, so that a loss of flux by a short circuit in the first annular portion is averted.

In an advantageous embodiment of the invention, the carrier ring is produced from a material with slip, such as red bronze or brass. Because of the good slip of the carrier ring, the usual plastic stop disk can be omitted, and the carrier ring can run directly up against the shaft bearing. When the motor is put together, the longitudinal play of the rotor or armature shaft is adjusted, by overpressing a plastic bearing plate that receives the shaft bearing, to the minimum amount that is required by different thermal expansions.

BRIEF DESCRIPTION OF THE DRAWINGS

Other features and advantages of the invention will be apparent from the detailed description contained herein below, taken in conjunction with the drawings, in which.

DESCRIPTION OF THE PREFERRED EMBODIMENT

Figure 1:
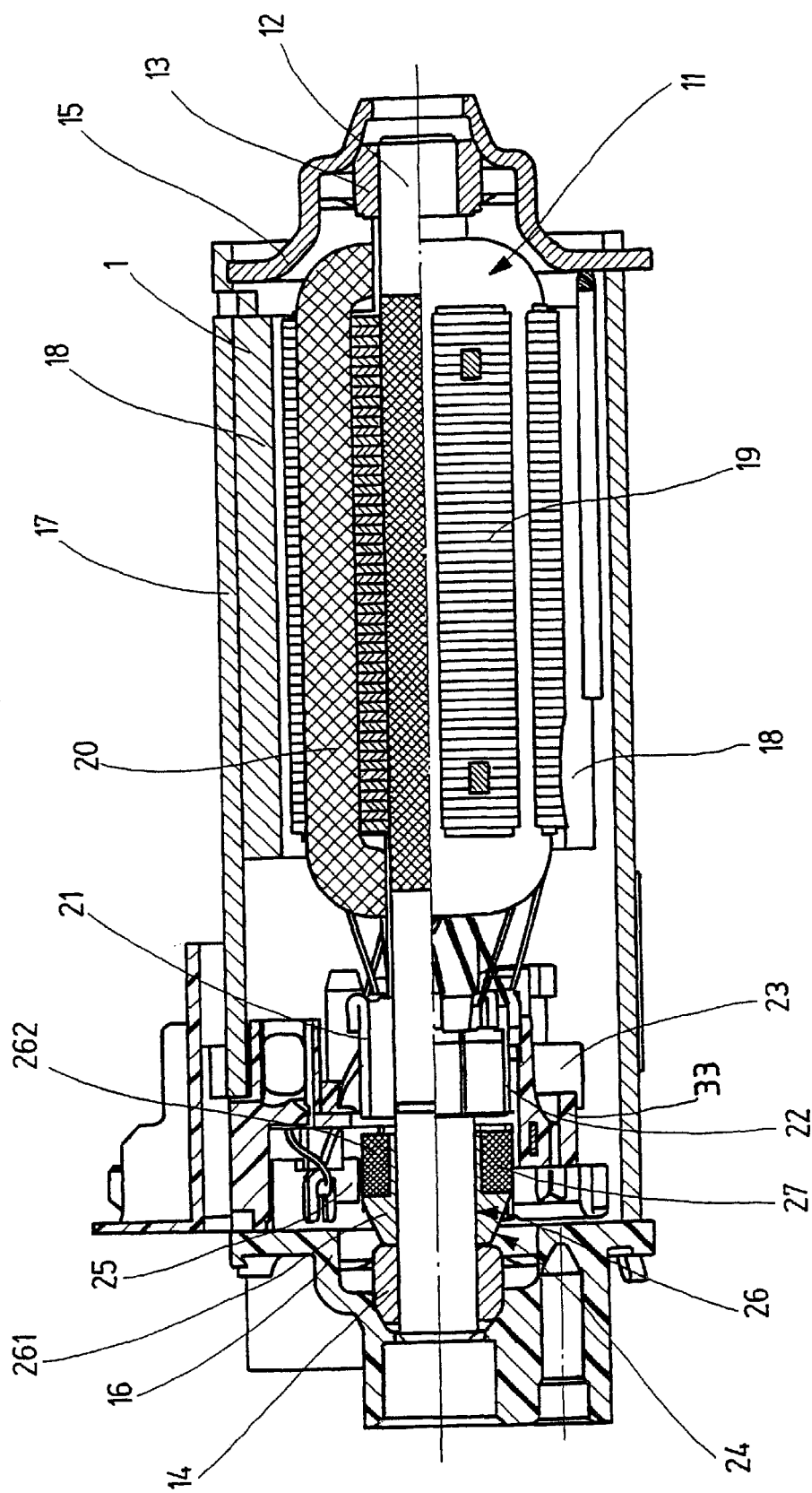
FIG. 1, is a longitudinal section through an electric commutator motor embodying the invention.

The commutator motor shown in longitudinal section in FIG. 1 is particularly will adapted for use as a drive motor for window controls, sliding roof actuators, seat adjusters, mirror adjusters, and the like in motor vehicles. It has a rotor 11, which can be driven in two directions of rotation and whose rotor shaft 12 is supported on both ends, each in a respective spherical bearing 13, 14. The two spherical bearings 13, 14 are each received in a respective bearing plate 15, 16, and each bearing plate closes off one face end of a motor housing 17. The cylindrical motor housing 17 carries permanent magnet segments 18 on its inside; these segments correspond in number to the number of magnet poles, and they surround the rotor 11 with clearance. The rotor 11, in armature grooves made in an iron lamination package 19, receives an armature winding 20, which is connected electrically to a commutator 21 secured to the rotor shaft 11. A number of carbon brushes 22 corresponding to the number of poles of the motor are placed radially on the commutator 21; they are supported radially displaceably in a brush shaft 23 and are press- fitted by a brush contact-pressure spring onto the surface of the commutator 21. Between the spherical bearing 14 and the commutator 21, the rotor shaft 11 carries a magnet body 24, which to detect the revolution and/or rpm cooperates with a Hall sensor 25 or Hall IC, which is fixedly disposed for instance on a brush holder 33 that carries the brush shafts 23.

Figure 2:
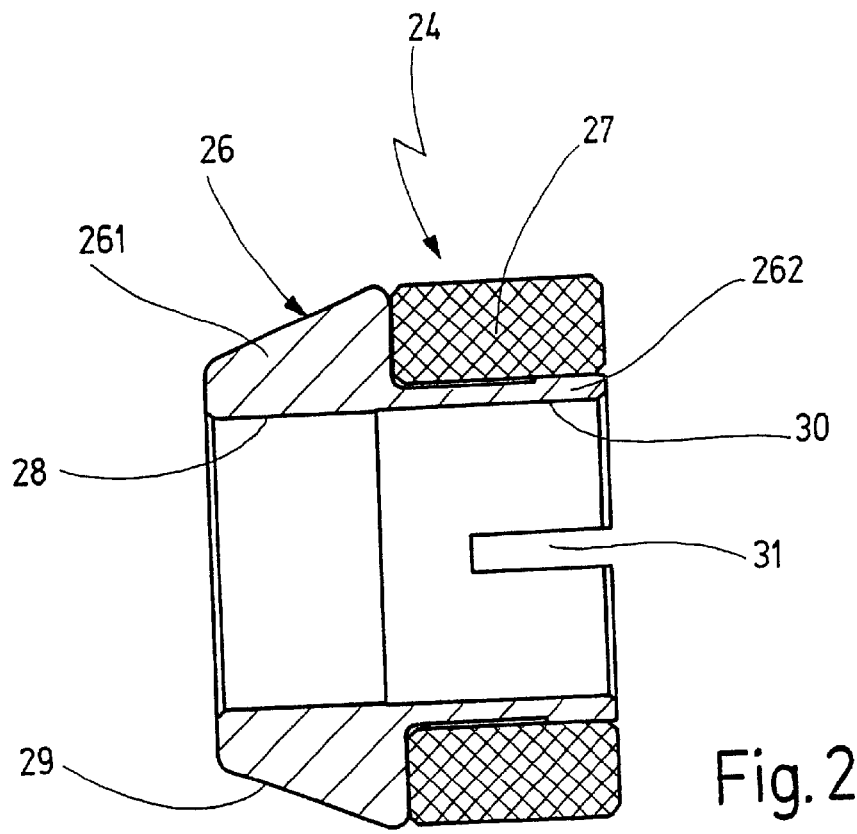
FIG. 2, is an enlarged view of a magnet body, revolving together with the rotor shaft, in the commutator motor of FIG. 1.

The magnet body 24, shown on a larger scale and in longitudinal section in FIG. 2, has a carrier ring 26, which is embodied as a metal ring or sintered ring, and a two- or multi-pole ring magnet 27 received by the carrier ring 26. The carrier ring 26, shown in FIG. 3 without the ring magnet 27, has a first annular portion 261 with an inside diameter 28, dimensioned to provide a press fit for creating a press-fitted seat on the rotor shaft 12, and a second annular portion 262, adjacent to it in the axial direction, with an inner bore 30 whose inside diameter is greater than the outside diameter of the rotor shaft 12. The first annular portion 261 has an outer jacket or surface 29, which tapers conically toward the face end of the carrier ring 26 remote from the second annular portion 262. The second annular portion 262 is slit axially; the at least one slit 31 is made from the face end of the carrier ring 26 remote from the first annular portion 262. The outer jacket of the second annular portion 262, which has a smaller diameter than the outer jacket 29 of the first annular portion 261, is provided with ribs 32.

Figure 3:
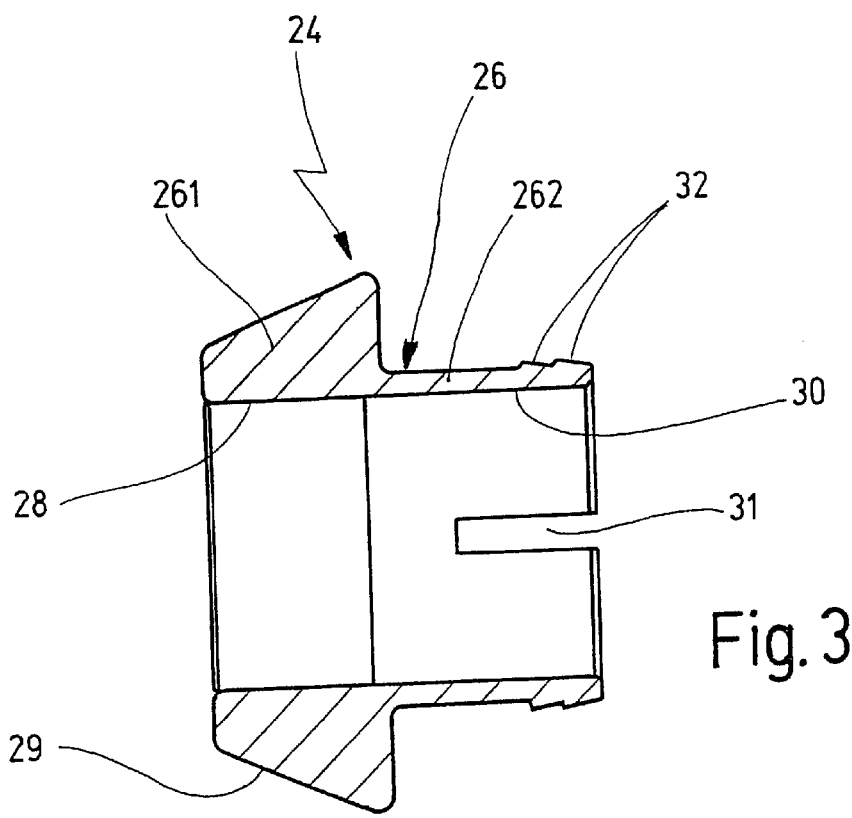
FIG. 3, is a view similar to FIG. 2, with the ring magnet removed.

In the exemplary embodiment of FIG. 3, the ribs are embodied as a pinecone profile, with two axially successive rings tapering conically toward the free end. However, axial, radial or intersecting ribs may also be provided. The fragile ring magnet 27, which is preferably injection molded from plastoferrite, is pressed with slight pressure onto the second annular portion 262 (FIG. 2). The ribs 32 assure an adequately firm seat, and the ring magnet 27 digs in by relaxation. Alternatively, the ring magnet 27 can be injection molded directly onto the second annular portion 262. The carrier ring 26 is made from nonmagnetic material, in order to avoid flux losses by short-circuiting on the cone end. A material with slip, such as red bronze, brass or the like, is preferably used, in order to assure low friction upon run-up against the spherical bearing 14, which is preferably made from sintered material. In the region of the press fit 28, the inside diameter of the first annular portion 261 is adapted to the outside diameter of the rotor shaft 12 in such a way that the resultant press fit on the rotor shaft 12 assures a force transmission to the rotor shaft 12 in the axial direction of at least 1000 N.

Upon assembly of the commutator motor, the fully assembled rotor 11, with the magnet body 24 fixed on the rotor shaft 12 by a press fit, which magnet body is press-fitted on in such a way that after the bearing plate 16 has been put in place no longitudinal armature play exists, is introduced into the motor housing 13. The brush holder 33 is put in place after that. The magnet body, because of the conical first annular portion 261, causes the carbon brushes 22 to spread apart, so that an additional assembly tool can be dispensed with. Once the commutator motor has been mounted in final form, the magnet body 24 is located directly between the commutator 21 and the spherical bearing 14. By overpressing the bearing plate 16, which is made of plastic, and the resultant displacement of the magnet body 24, the longitudinal armature play is adjusted to the minimum amount dictated by variable thermal expansion.

The foregoing relates to preferred exemplary embodiments of the invention, it being understood that other variants and embodiments thereof are possible within the spirit and scope of the invention, the latter being defined by the appended claims.

What is claimed is:

1. In an electric motor, having a magnet body (24), disposed in a manner fixed against relative rotation on a rotor shaft (12) for scanning the revolution and/or rpm, which body has a carrier ring (26), seated on the rotor shaft (12) with a press fit, and a multi-pole ring magnet (27) received by the carrier ring (26), an improvement wherein the carrier ring (26) has a first annular portion (261) for the press fit on the rotor shaft (12) and adjacent to the first annular portion in the axial direction a second annular portion (262) for receiving the ring magnet (27), the second annular portion having an inside diameter that is greater than the outside diameter of the rotor shaft (12), and wherein the carrier ring (26) is made from a material selected from a group of solid metal and sintered metal.

2. The motor according to claim 1, wherein the second annular portion (262) has at least one axially extending slit formed therein, said at least one slit (31) is made beginning at the face end of the carrier ring (26) remote from the first annular portion (262).

3. The motor according to claim 1, wherein the outer jacket of the second annular portion (262), which jacket receives the ring magnet (27), is provided with ribs (32) on its outer surface.

4. The motor according to claim 3, wherein the completed ring magnet (27) is sized such that said completed ring magnet is pressed onto the second annular portion (262) with only sleight pressure.

5. The motor according to claim 3, wherein the ring magnet (27) is injection molded from plastoferrite.

6. The motor according to claim 3, wherein the carrier ring (26) is produced from a material with slip.

7. The motor according to claim 1, wherein the completed ring magnet (27) is sized such that said completed ring magnet is pressed onto the second annular portion (262) with only sleight pressure.

8. The motor according to claim 7, wherein the ring magnet (27) is injection molded from plastoferrite.

9. The motor according to claim 7, wherein the carrier ring (26) is produced from a material with slip.

10. The motor according to claim 1, wherein the ring magnet (27) is injection molded from plastoferrite.

11. The motor according to claim 10, wherein the carrier ring (26) is produced from a material with slip.

12. The motor according to claim 1, wherein the carrier ring (26) is produced from a material with slip.

13. The motor according to claim 1, wherein the carrier ring (26) is made of nonmagnetic material.

14. The motor according to claim 1, wherein the inside diameter of the first annular portion (261) is sized relative to the outside diameter of the rotor shaft (12) in such a way that when press fit onto the rotor shaft, a potential transmission of force to the rotor shaft (12) in the axial direction of equal to or greater than 1000 N can be assured.

15. In an electric motor, having a magnet body (24), disposed in a manner fixed against relative rotation on a rotor shaft (12) for scanning the revolution and/or rpm, which body has a carrier ring (26), seated on the rotor shaft (12) with a press fit, and a multi-pole ring magnet (27) received by the carrier ring (26), an improvement wherein the carrier ring (26) has a first annular portion (261) for the press fit on the rotor shaft (12) and adjacent to the first annular portion in the axial direction a second annular portion (262) for receiving the ring magnet (27), the second annular portion having an inside diameter that is greater than the outside diameter of the rotor shaft (12), wherein the second annular portion (262) has at least one axially extending slit formed therein, said at least one slit (31) is made beginning at the face end of the carrier ring (26) remote from the first annular portion (261).

16. The motor according to claim 15, wherein the second annular portion includes an outer jacket, said jacket receives the ring (27), being provided with ribs (32) on an outer surface thereof.

17. The motor according to claim 15, wherein the completed ring magnet (27) is sized such that when it is pressed onto the second annular portion (262) it can be done with only sleight pressure.

18. The motor according to claim 15, wherein the ring magnet (27) is injection molded from plastoferrite.

19. The motor according to claim 15, wherein the carrier ring (26) is made from a material selected form the group of solid metal and sintered metal.

20. The motor according to claim 15, wherein the carrier ring (26) is produced from a material with slip.

21. The motor according to claim 15, wherein the carrier ring (26) is produced from a material with slip.

* * * * *